United States Patent
Doggett et al.

(10) Patent No.: US 10,387,188 B2
(45) Date of Patent: Aug. 20, 2019

(54) VIRTUAL MACHINE SCOPING OF DATA ON A HYPERVISOR

(71) Applicant: INTERNATIONAL BUSINESS MACHINES CORPORATION, Armonk, NY (US)

(72) Inventors: Kristian Doggett, Austin, TX (US); Douglas Griffith, Burnet, TX (US); Ahmed Hikal, Haram (EG); Akeem Lawal, Pearland, TX (US); Paul Vaters, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 89 days.

(21) Appl. No.: 15/807,995

(22) Filed: Nov. 9, 2017

(65) Prior Publication Data

US 2019/0138335 A1    May 9, 2019

(51) Int. Cl.
*G06F 9/455* (2018.01)
*G06F 9/4401* (2018.01)
*G06F 9/50* (2006.01)
*G06F 11/07* (2006.01)

(52) U.S. Cl.
CPC ........ *G06F 9/45558* (2013.01); *G06F 9/4401* (2013.01); *G06F 9/5077* (2013.01); *G06F 11/0712* (2013.01); *G06F 11/0778* (2013.01); *G06F 2009/4557* (2013.01); *G06F 2009/45562* (2013.01)

(58) Field of Classification Search
CPC .. G06F 9/4401; G06F 9/45558; G06F 9/5077; G06F 2009/45591; G06F 11/0712; G06F 11/0778

USPC .............................. 713/1, 2; 714/38.1; 718/1
See application file for complete search history.

(56) References Cited

U.S. PATENT DOCUMENTS

| | | | |
|---|---|---|---|
| 8,141,094 B2* | 3/2012 | Brown | G06F 13/102 710/2 |
| 8,423,997 B2* | 4/2013 | Nakai | G06F 11/079 711/100 |
| 8,671,405 B2* | 3/2014 | Nicholas | G06F 11/0712 714/38.11 |
| 9,740,520 B1* | 8/2017 | Sarda | G06F 9/45558 |
| 2012/0246517 A1 | 9/2012 | Bender et al. | |

(Continued)

OTHER PUBLICATIONS

Salapura et al., "ResilientVM: High Performance Virtual Machine Recovery in the Cloud," International Workshop on Automated Incident Management in Cloud, 2015, pp. 1-6.

(Continued)

*Primary Examiner* — Joseph R Kudirka
(74) *Attorney, Agent, or Firm* — Cantor Colburn LLP; David Quinn

(57) ABSTRACT

A computer-implemented method includes establishing, during boot time of a virtual machine, a virtual remote access service (VRAS) device between the virtual machine and a hypervisor booting the virtual machine. A request for scoped data relevant to the virtual machine is received at the hypervisor from the virtual machine, by way of the VRAS device. The scoped data relevant to the virtual machine is collected by the hypervisor. The scoped data relevant to the virtual machine is transmitted across the VRAS device from the hypervisor to the virtual machine.

20 Claims, 4 Drawing Sheets

(56) References Cited

U.S. PATENT DOCUMENTS

2015/0278129 A1 10/2015 Keeriyadath et al.
2015/0355983 A1 12/2015 Harper et al.

OTHER PUBLICATIONS

Valdez et al., "Retrofitting the IBM Power Hypervisor to Support Mandatory Access Control," 23rd Annual Computer Security Applications Conference, 2007, pp. 1-10.

* cited by examiner

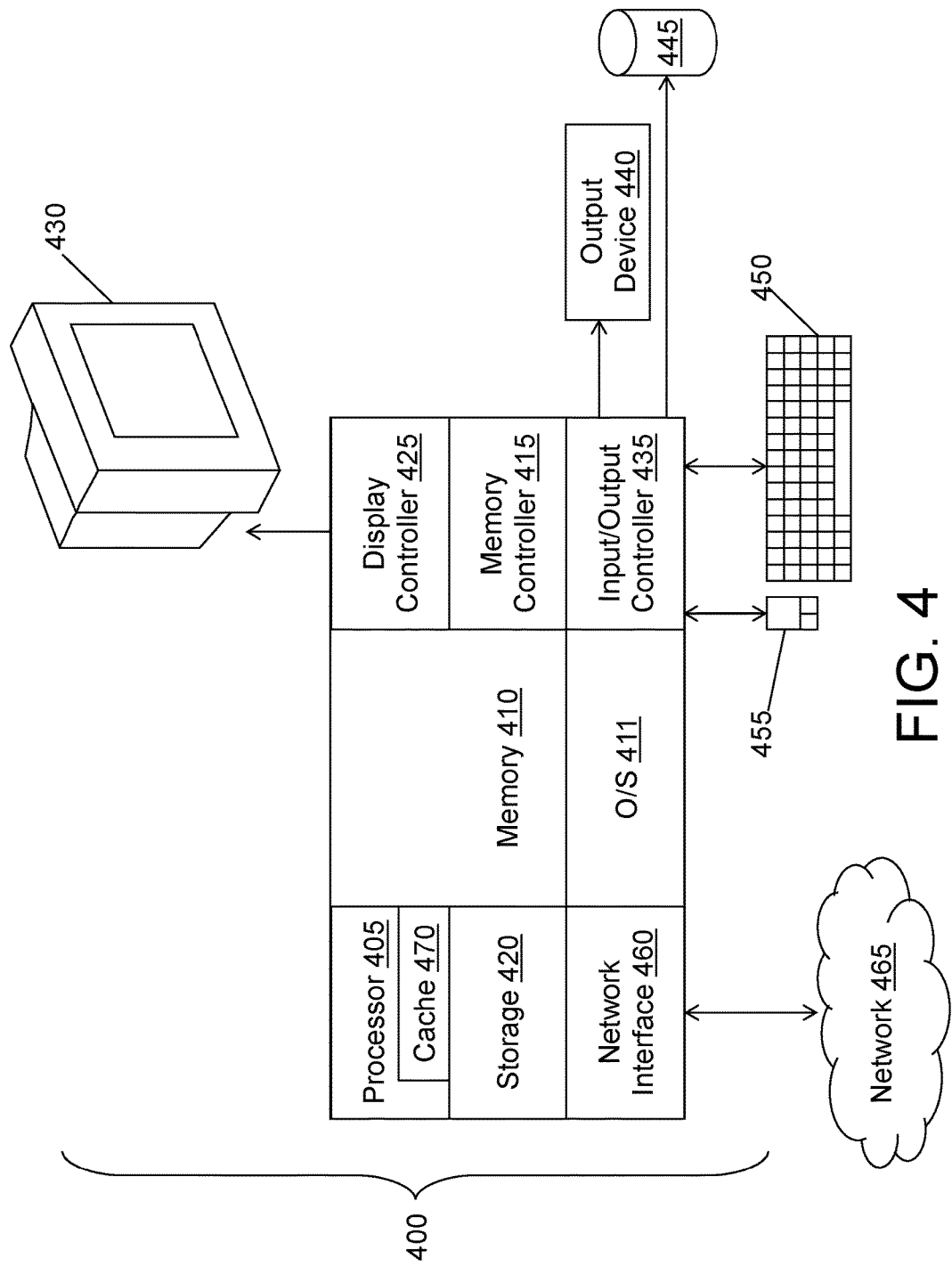

VIRTUAL MACHINE SCOPING OF DATA ON A HYPERVISOR

BACKGROUND

The present invention relates to virtual machines and, more specifically, to virtual machine scoping of data on a hypervisor.

Generally, a virtual machine (VM) is a virtualized computing device that runs over a hypervisor. The hypervisor has access to physical resources, such as a processor and memory, and the hypervisor provides virtual resources to the VM, such that the VM is able to treat these resources as physical. In truth, however, the VM's resources are an abstraction maintained by the hypervisor, to which the VM is blind.

Often, customers, which may be individuals or organizations, rent VMs from a service provider. In these cases, an administrator of such a VM will grant permissions to an administrator of the customer associated with the VM, but these permissions likely will not include authorization to access the hypervisor. Occasionally, the VM may require troubleshooting. In these cases, a snap, or snapshot, of that VM can be taken from within the VM, such as by the administrator, where that snap describes a current state of the VM, absent information about the hypervisor. This state of the VM is used to troubleshoot or perform other activities.

SUMMARY

Embodiments of the present invention are directed to a computer-implemented method for scoping data on a hypervisor. A non-limiting example of the computer-implemented method includes establishing, during boot time of a virtual machine, a virtual remote access service (VRAS) device between the virtual machine and a hypervisor booting the virtual machine. A request for scoped data relevant to the virtual machine is received at the hypervisor from the virtual machine, by way of the VRAS device. The scoped data relevant to the virtual machine is collected by the hypervisor. The scoped data relevant to the virtual machine is transmitted across the VRAS device from the hypervisor to the virtual machine.

Embodiments of the present invention are directed to a system for scoping data on a hypervisor. A non-limiting example of the system includes a memory having computer-readable instructions and one or more processors for executing the computer-readable instructions. The computer-readable instructions include establishing, during boot time of a virtual machine, a VRAS device between the virtual machine and a hypervisor booting the virtual machine. Further according to the computer-readable instructions, a request for scoped data relevant to the virtual machine is received at the hypervisor from the virtual machine, by way of the VRAS device. The scoped data relevant to the virtual machine is collected by the hypervisor. The scoped data relevant to the virtual machine is transmitted across the VRAS device from the hypervisor to the virtual machine.

Embodiments of the invention are directed to a computer-program product for scoping data on a hypervisor, the computer-program product comprising a computer-readable storage medium having program instructions embodied therewith. The program instructions are executable by a processor to cause the processor to perform a method. A non-limiting example of the method includes establishing, during boot time of a virtual machine, a VRAS device between the virtual machine and a hypervisor booting the virtual machine. Further according to the method, a request for scoped data relevant to the virtual machine is received at the hypervisor from the virtual machine, by way of the VRAS device. The scoped data relevant to the virtual machine is collected by the hypervisor. The scoped data relevant to the virtual machine is transmitted across the VRAS device from the hypervisor to the virtual machine.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 is a block diagram of a computer system for implementing some or all aspects of the scoping system, according to some embodiments of this invention.

Figure 1:
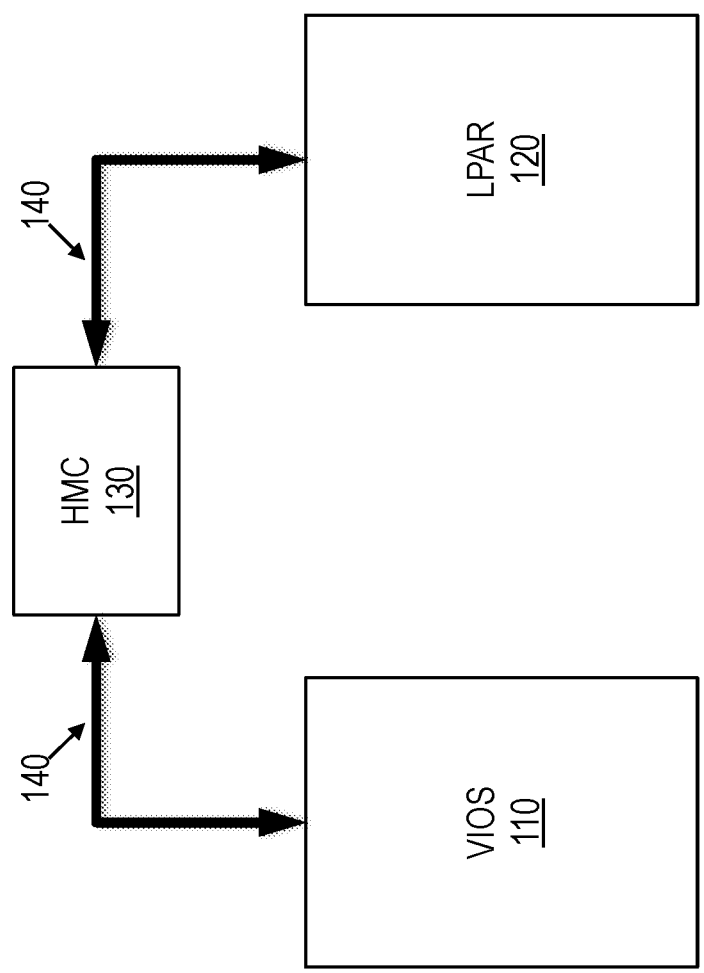
FIG. 1 is a block diagram of a conventional virtual machine and hypervisor arrangement.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a snap taken through the VM through conventional mechanisms usually will exclude information related to the state of the hypervisor, because the VM is generally blind to the hypervisor or has no permission to access the hypervisor, or both. However, because the VM's resources are based on the hypervisor's resources, the hypervisor state may be relevant to troubleshooting the VM. For instance, if the hypervisor is experiencing high memory utilization, then the VM may experience the effects of that, even if the VM itself is not experiencing high memory utilization within its virtual memory.

FIG. 1 is a block diagram of an example conventional arrangement of a hypervisor and VM. As shown in FIG. 1, a virtual input/output server (VIOS) 110 is the hypervisor and is connected to a logical partition (LPAR) 120, which is the VM in this example. The VIOS 110 is connected to the LPAR 120 by way of a hardware management console (HMC) 130, which is connected to each of the VIOS 110 and the LPAR 120 by a resource monitoring and control (RMC) connection 140.

Although a snap does not conventionally include information about the VIOS 110 due to lack of authorization, given this conventional arrangement, the RMC connection 140 may be used for collecting information about the VIOS 110 for inclusion in the snap. However, in some cases, there may be a failure in the RMC connection 140, and as a result, the snap might fail to include information about the VIOS 110 because detection of this information might not be able to complete over a failed RMC connection 140. Further, if a connectivity failure between the VIOS 110 and the LPAR 120 requires debugging, then a snap will fail to provide the information necessary for this debugging.

Turning now to an overview of the aspects of the invention, one or more embodiments of a scoping system according to this disclosure address the above-described shortcomings of the prior art by providing a virtual remote access device (VRAS) device between a VM and a hypervisor, such that scoped data about the hypervisor and applicable to the VM may be collected over the VRAS device and included in VM data collection. In some embodiments of the invention, the VRAS device may transmit communications between a command-and-response queue (CRQ) pair, where one of such CRQs in the pair resides on the VM and the other resides on the hypervisor. Further, a listener service may run on the hypervisor for filtering data to be transmitted to the VM over the VRAS device.

The above-described aspects of the invention address the shortcomings of the prior art by providing a mechanism for the VM to acquire scoped data from the hypervisor, where that scoped data is applicable to the VM and excludes unnecessary information about other VMs running on the hypervisor. Because the hypervisor and the VM are likely on the same physical server, the VRAS device may be maintained on that server even if a network to which the VM and the hypervisor are connected is down. Embodiments of the invention may require low overhead and complexity and need not require or risk the collection of data related to other VMs serviced by the hypervisor. The scoped data may be filtered to include only data relevant to the VM in question.

Figure 2:
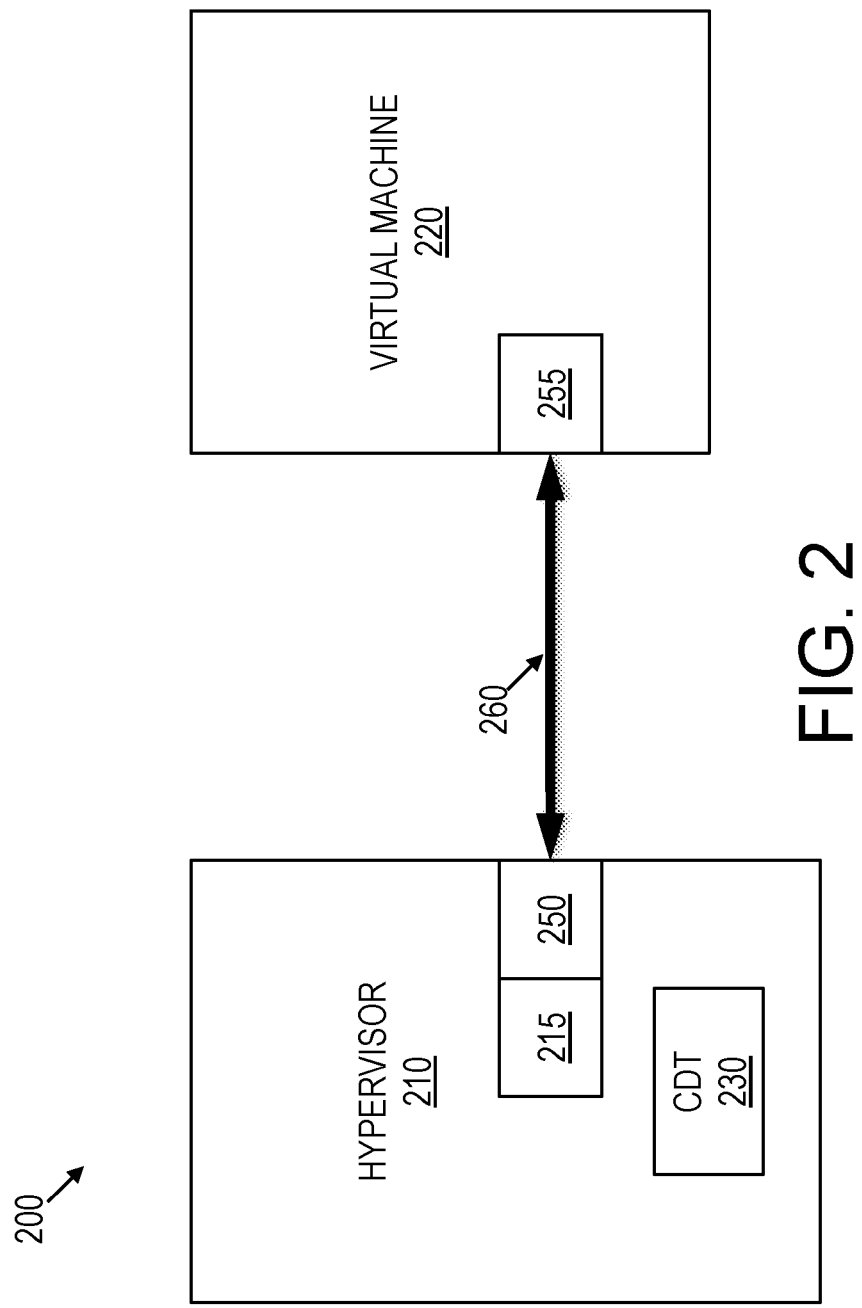
FIG. 2 is a block diagram of a scoping system, according to some embodiments of this invention.

Turning now to a more detailed description of aspects of the present invention, FIG. 2 depicts a scoping system 200 according to embodiments of the invention. As shown, the scoping system 200 includes a hypervisor 210 and one or more VMs 220. In some embodiments of the invention, the hypervisor 210 includes or is in communication with a listener service 215. The listener service 215 may run on the hypervisor 210. Because the listener service 215 has access to the hypervisor 210, which generally has higher permissions than the VM 220, the listener service 215 may have knowledge of activities on both the VM 220 and the hypervisor 210. In some embodiments of the invention, the listener service 215 may be implemented as a hardware circuit, software, or a combination of both. The hypervisor 210 may also include a component dump table (CDT) 230, which may maintain references to callback functions to be invoked when a VM 220 crashes. The use of this CDT 230 will be described further below.

The hypervisor 210 and a VM 220 may be connected by way of a CRQ connection, which may include a hypervisor CRQ 250 at the hypervisor 210 connected to a VM CRQ 255 at the VM 220. The hypervisor CRQ 250 and the VM CRQ 255 may each be a task queue configured to receive, send, and manage messages from the other CRQ in the pair. The hypervisor CRQ 250 and the VM CRQ 255 may thus be in communication with one another, effecting a virtual remote access service (VRAS) device 260 for transmissions between the hypervisor 210 and the VM 220. In short, the VRAS device 260 may simulate an ethernet connection between the hypervisor and the VM 220. In some embodiments of the invention, the VRAS device 260 may be implemented as a virtual object created at the time the VM 220 is booted by the hypervisor 210. More specifically, when booting the VM 220, the hypervisor 210 may create the VM CRQ 255 and, if not already in existence, the hypervisor CRQ 250 so as to create the VRAS device 260. The CRQ connection and resulting VRAS device 260 may thus be inherently secure as it exists between the VM 220 and the hypervisor 210, inaccessible by other VMs 220 or outside components. In some embodiments of the invention, the VM 220 need not have authorization to access the hypervisor in order to transmit a message, such as a request, over the VRAS device 260. As described further below, the listener service 215 of the hypervisor 210 may deliver data from the hypervisor 210 to the VM 220 across the VRAS device 260 as needed, such as in response to requests received over the VRAS device 260.

It will be understood by one skilled in the art that, although portions of this disclosure reference one VM 220, this referenced VM 220 is exemplary, and one or more other VMs 220 running on the hypervisor 210 may behave in similar manners. For instance, in some embodiments of the invention, each VM 220 of one or more VMs 220 running on the hypervisor 210 may have a respective VRAS device 260 established between that VM 220 and the hypervisor 210 for communicating requests and scoped data.

The communications system 200 may be enable the VM 220 to access one or more types of data from the hypervisor 210. For instance, in some embodiments of the invention, the communications system 100 may enable VM access to configuration data (i.e., a snap), statistical data (i.e., performance data), or state data (i.e., a dump). Configuration data may include, for example, specific mappings from a VM's virtual devices to physical devices on the hypervisor 210, state data pertaining to these physical devices, or general hypervisor configuration for shared physical devices being presented to the VM 220. Statistical data may include, for example, rates and counters of various statics related to the physical devices of the hypervisor 210, processor load of the hypervisor 210, memory load of the hypervisor 210, or interval trace data related to the physical devices. State data may include, for example, a combination of the above or other relevant data acquired as a dump.

Figure 3:
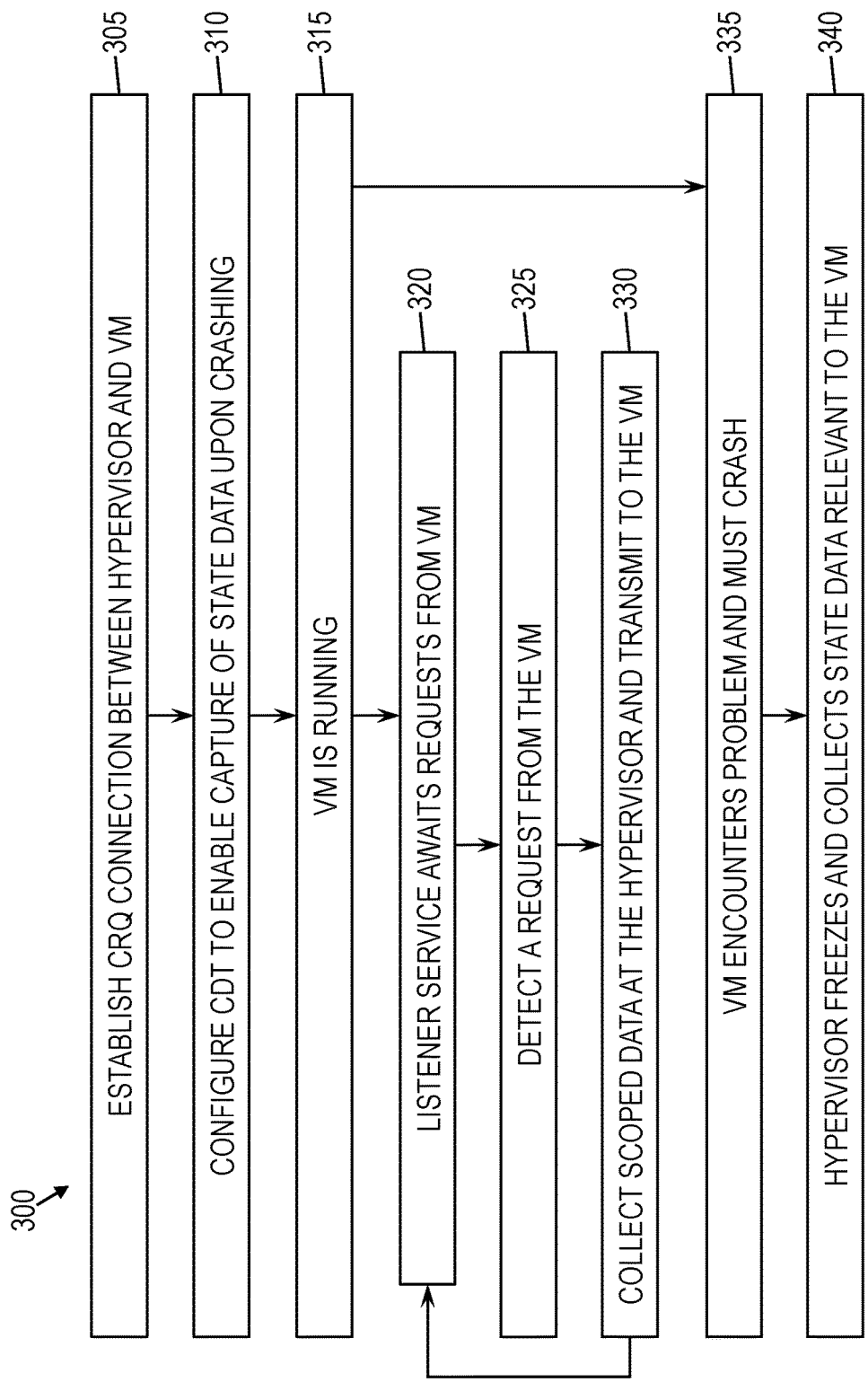
FIG. 3 is a flow diagram of a method for scoping data of a hypervisor, according to some embodiments of the invention.

FIG. 3 is a flow diagram of a method 300 for scoping data from a hypervisor 210 by a VM 220, according to some embodiments of this invention.

As shown in FIG. 3, at block 305, a CRQ connection may be established, such as by the hypervisor 210, between the VM 220 and the hypervisor 210. Specifically, in some embodiments of the invention, a VM CRQ 255 of the VM 220 is established to communicate with a hypervisor CRQ 250 of the hypervisor 210, thus forming a VRAS device 260 between the hypervisor 210 and the VM 220. In some embodiments of the invention, the hypervisor CRQ 250 is dedicated to use with the VM CRQ 255, such that a distinct hypervisor CRQ 250 is used for each VM 220 with a respective VRAS device 260. In that case, the hypervisor CRQ 250 may also be established during booting of the VM 220. In some embodiments of the invention, the CRQ connection and resulting VRAS device 260 may be established while the VM 220 is booting.

At block 310, the CDT 230 of the hypervisor 210 may be configured to enable the capture of state data at the hypervisor 210 if the VM 220 is crashing. Conventionally, a CDT 230 maintains a set of functions corresponding to various components serviced by the hypervisor 210. Each entry in the CDT 230 may map a component to a corresponding function, where the corresponding function is meant to be called when the respective component crashes. When a component crash is detected by the hypervisor 210, the hypervisor 210 may call each function corresponding to that component in the CDT 230. Specifically, to configure the CDT 230 according to some embodiments of the invention, at least one entry may be added to the CDT 230. A first entry added to the CDT 230 may map the VM 220 to a first function, where the first function freezes the hypervisor 210. A second entry added to the CDT 230 may map the VM 220 to a second function, where the second function collects state data related to the VM 220 from the hypervisor 210. Thus, when the VM 220 needs to crash, the hypervisor 210 may freeze, so as to retain its state at the time of the crash, and state data of the VM 220 may be collected based on that frozen state of the hypervisor 210. In some embodiments of the invention, the CDT 230 may be configured as described above while the VM 220 is booting.

At block 315, the VM 220 is running after having been booted. At block 320, the listener service 215 of the hypervisor 210 awaits requests from the VM 220. In some embodiments of the invention, such requests are received over the VRAS device 260 formed by the CRQ connection. Thus, the listener service 215 may monitor the hypervisor CRQ 250 for incoming messages from the VM CRQ 255. At block 325, the listener service 215 detects a request from the VM 220 for scoped, or limited, data. In some embodiments of the invention, this request is communicated across the VRAS device 260, such that the request is transmitted from the VM CRQ 255 and received by the hypervisor CRQ 250. For example, and not by way of limitation, the request may be initiated at the VM 220 by way of a call to a conventional command that is modified according to some embodiments of the invention. For instance, implementation of the conventional command "vmstat," which traditionally collects VM statistics, may be expanded to include a request across the VRAS device 260. Regardless of how the request is initiated at the VM 220, the request may specify a certain type of scoped data, such as configuration, statistical, or state data.

At block 330, the hypervisor 210 may collect and transmit the requested data to the VM 220, filtering as needed such that the transmitted data excludes information not relevant to the VM 220. For example, and not by way of limitation, information not relevant to the VM 220 may include information about software or other VMs 220 running on the hypervisor 210, or information about hardware not available to the VM 220 in question. In some embodiments of the invention, data deemed relevant may be predetermined manually by an administrator, automatically, or a combination of both. For instance, each data type that can be requested may be mapped to specific data and how to collect and, if applicable, filter that data. The resulting scoped data may be transmitted from the hypervisor 210 across the VRAS device 260 to the VM 220. In some embodiments of the invention, this scoped data may then be combined with data collected on the VM 220 and returned to an administrator. The method 300 may then return to block 315, where the listener service 215 awaits a further request from the VM 220.

At block 335, however, the VM 220 may encounter a problem that causes it to crash. Thus, at block 340, the hypervisor may check the CDT 230 and may run the functions corresponding to the VM 220 according to the CDT 230. As a result, given the first and second entries added to the CDT 230 according to some embodiments of this invention, the hypervisor may freeze and then collect information about the hypervisor state that is relevant to the VM 220. Thus, the hypervisor 210 may capture its real-time or close-to-real-time state at the time of the VM crash. When the VM 220 restarts later, that state data may, therefore, be available to describe the state of the VM 220 at the time of the crash. In some embodiments of the invention, that state data may be automatically transmitted to the VM 220 responsive to the VM 220 being restarted after having crashed. Thus, state data may be captured upon request as well as responsive to a crash.

After the scoped data is transmitted, either by request or automatically responsive to a crash, troubleshooting may be performed on the VM 220. The troubleshooting may include, for example, debugging. In some embodiments of the invention, the troubleshooting occurs automatically by the VM 220, or the troubleshooting is performed manually by a user or administrator. Thus, the VM 220 may be more effectively managed without harming the integrity of the hypervisor 210 or other VMs 220 on the hypervisor 210.

FIG. 4 illustrates a block diagram of a computer system 400 for use in implementing a scoping system 200 or method according to some embodiments of the invention. The scoping systems 200 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid-state drive. The stored instructions in memory 410 or in storage 420 may include those enabling the processor to execute one or more aspects of the scoping systems 200 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Scoping systems 200 and methods according to this disclosure may be embodied, in whole or in part, in computer program products or in computer systems 400, such as that illustrated in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A computer-implemented method, comprising:
establishing, during boot time of a virtual machine, a virtual remote access service (VRAS) device between the virtual machine and a hypervisor booting the virtual machine;

receiving, at the hypervisor from the virtual machine, by way of the VRAS device, a request for scoped data relevant to the virtual machine;

collecting, by the hypervisor, the scoped data relevant to the virtual machine; and transmitting the scoped data relevant to the virtual machine across the VRAS device from the hypervisor to the virtual machine.

2. The computer-implemented method of claim 1, wherein the establishing the VRAS device comprises:

establishing a hypervisor command-and-response queue (CRQ) at the hypervisor; and establishing a virtual machine (VM) CRQ at the virtual machine, wherein the VM CRQ is in communication with the hypervisor CRQ.

3. The computer-implemented method of claim 2, wherein the receiving the request for scoped data relevant to the virtual machine comprises running on the hypervisor a listener service to monitor the hypervisor CRQ.

4. The computer-implemented method of claim 1, further comprising:

inserting, into a component dump table (CDT) of the hypervisor, a first function associated with the virtual machine and configured to freeze the hypervisor responsive to a crash of the virtual machine; and inserting, into the CDT of the hypervisor, a second function associated with the virtual machine and configured to collect, from the hypervisor, data relevant to the virtual machine.

5. The computer-implemented method of claim 4, further comprising:

detecting that the virtual machine is crashing;

freezing the hypervisor, responsive to the virtual machine's crashing; and collect, from the hypervisor, data relevant to the virtual machine, responsive to the virtual machine's crashing.

6. The computer-implemented method of claim 1, wherein the collecting the scoped data relevant to the virtual machine comprises:

collecting initial data from the hypervisor; and filtering, from the initial data, data relevant to one or more other virtual machines running on the hypervisor.

7. The computer-implemented method of claim 1, wherein the hypervisor and the virtual machine reside on a common server, and wherein the VRAS device is established on the common server.

8. A system comprising:

a memory having computer-readable instructions; and one or more processors for executing the computer-readable instructions, the computer-readable instructions comprising:

establishing, during boot time of a virtual machine, a virtual remote access service (VRAS) device between the virtual machine and a hypervisor booting the virtual machine;

receiving, at the hypervisor from the virtual machine, by way of the VRAS device, a request for scoped data relevant to the virtual machine;

collecting, by the hypervisor, the scoped data relevant to the virtual machine; and transmitting the scoped data relevant to the virtual machine across the VRAS device from the hypervisor to the virtual machine.

9. The system of claim 8, wherein the establishing the VRAS device comprises:

establishing a hypervisor command-and-response queue (CRQ) at the hypervisor; and establishing a virtual machine (VM) CRQ at the virtual machine, wherein the VM CRQ is in communication with the hypervisor CRQ.

10. The system of claim 9, wherein the receiving the request for scoped data relevant to the virtual machine comprises running on the hypervisor a listener service to monitor the hypervisor CRQ.

11. The system of claim 8, wherein the computer-readable instructions further comprise:

inserting, into a component dump table (CDT) of the hypervisor, a first function associated with the virtual machine and configured to freeze the hypervisor responsive to a crash of the virtual machine; and inserting, into the CDT of the hypervisor, a second function associated with the virtual machine and configured to collect, from the hypervisor, data relevant to the virtual machine.

12. The system of claim 11, wherein the computer-readable instructions further comprise:

detecting that the virtual machine is crashing;

freezing the hypervisor, responsive to the virtual machine's crashing; and collect, from the hypervisor, data relevant to the virtual machine, responsive to the virtual machine's crashing.

13. The system of claim 8, wherein the collecting the scoped data relevant to the virtual machine comprises:

collecting initial data from the hypervisor; and filtering, from the initial data, data relevant to one or more other virtual machines running on the hypervisor.

14. The system of claim 8, wherein the hypervisor and the virtual machine reside on a common server, and wherein the VRAS device is established on the common server.

15. A computer-program product for scoping data on a hypervisor, the computer-program product comprising a computer-readable storage medium having program instructions embodied therewith, the program instructions executable by a processor to cause the processor to perform a method comprising:

establishing, during boot time of a virtual machine, a virtual remote access service (VRAS) device between the virtual machine and a hypervisor booting the virtual machine;

receiving, at the hypervisor from the virtual machine, by way of the VRAS device, a request for scoped data relevant to the virtual machine;

collecting, by the hypervisor, the scoped data relevant to the virtual machine; and transmitting the scoped data relevant to the virtual machine across the VRAS device from the hypervisor to the virtual machine.

16. The computer-program product of claim 15, wherein the establishing the VRAS device comprises:

establishing a hypervisor command-and-response queue (CRQ) at the hypervisor; and establishing a virtual machine (VM) CRQ at the virtual machine, wherein the VM CRQ is in communication with the hypervisor CRQ.

17. The computer-program product of claim 16, wherein the receiving the request for scoped data relevant to the virtual machine comprises running on the hypervisor a listener service to monitor the hypervisor CRQ.

18. The computer-program product of claim 15, wherein the method further comprises:

inserting, into a component dump table (CDT) of the hypervisor, a first function associated with the virtual machine and configured to freeze the hypervisor responsive to a crash of the virtual machine; and inserting, into the CDT of the hypervisor, a second function associated with the virtual machine and configured to collect, from the hypervisor, data relevant to the virtual machine.

19. The computer-program product of claim 18, wherein the method further comprises:
    detecting that the virtual machine is crashing;
    freezing the hypervisor, responsive to the virtual machine's crashing; and
    collect, from the hypervisor, data relevant to the virtual machine, responsive to the virtual machine's crashing.

20. The computer-program product of claim 15, wherein the collecting the scoped data relevant to the virtual machine comprises:
    collecting initial data from the hypervisor; and
    filtering, from the initial data, data relevant to one or more other virtual machines running on the hypervisor.

\* \* \* \* \*